April 2, 1957 L. E. SMITH 2,787,431
FISHING ROD REST AND CARRIER
Filed Oct. 2, 1953 2 Sheets-Sheet 1

INVENTOR.
LESTER E. SMITH,
BY
McMorrow, Berman + Davidson
ATTORNEYS.

April 2, 1957 L. E. SMITH 2,787,431
FISHING ROD REST AND CARRIER
Filed Oct. 2, 1953 2 Sheets-Sheet 2
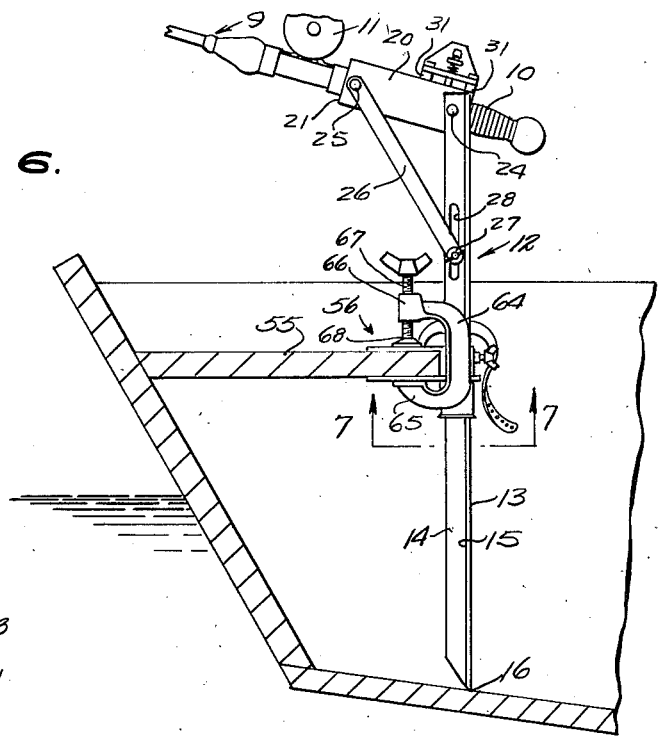
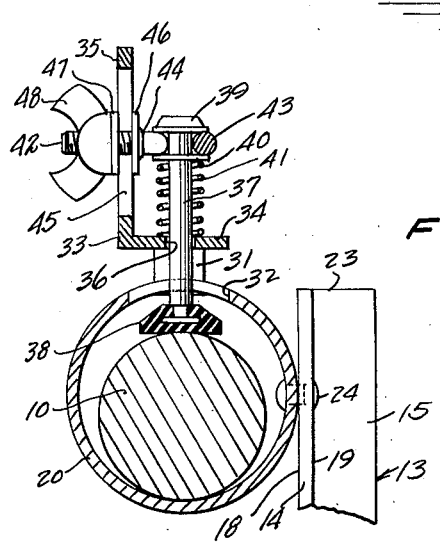
INVENTOR.
LESTER E. SMITH,
BY
McMorrow, Berman + Davidson
ATTORNEYS.

United States Patent Office 2,787,431
Patented Apr. 2, 1957

2,787,431

FISHING ROD REST AND CARRIER

Lester E. Smith, Bellingham, Wash.

Application October 2, 1953, Serial No. 383,773

3 Claims. (Cl. 248—42)

This invention relates to a combined fishing rod rest and carrier, and the primary object of the invention is to provide an efficient and practical device of this kind which is adapted to support an associated fishing rod at various heights and angles on and relative to the ground, or on and relative to a boat or the like, in fishing position, and is adapted to be folded alongside of the fishing rod and to be secured thereto so as to form a compact bundle wherein the device serves as a carrier for the fishing rod.

Another important object of the invention is to provide a device of the character indicated above which can be quickly and easily adjusted as to height and as to angulation of a fishing rod supported thereon, which will not readily come out of adjusted condition under fishing conditions, which is composed of a minimum number of simple parts, and which can be made in a rugged and serviceable form at relatively low cost.

Other important objects and advantageous features of the invention will be apparent from the following description and the accompanying drawings, wherein, for purposes of illustration only, specific forms of the invention are set forth in detail.

In the drawings:

Figure 4 is a fragmentary transverse vertical section taken on the line 4—4 of Figure 2;

Figure 6 is a sectional and side elevation of another form of the invention;

Figure 7 is an enlarged horizontal section taken on the line 7—7 of Figure 6; and Figure 8 is a fragmentary vertical section, taken on the line 8—8 of Figure 7.

Figure 1:
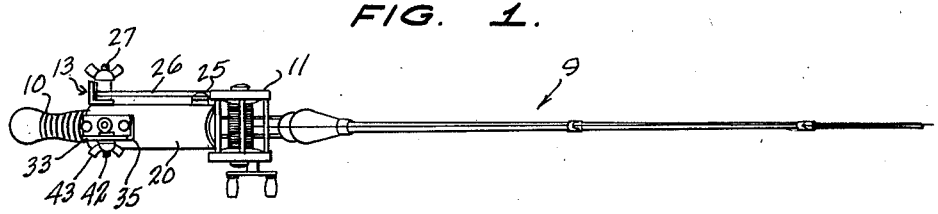
Figure 1 is a top plan view of one form of the invention.
Figure 2:
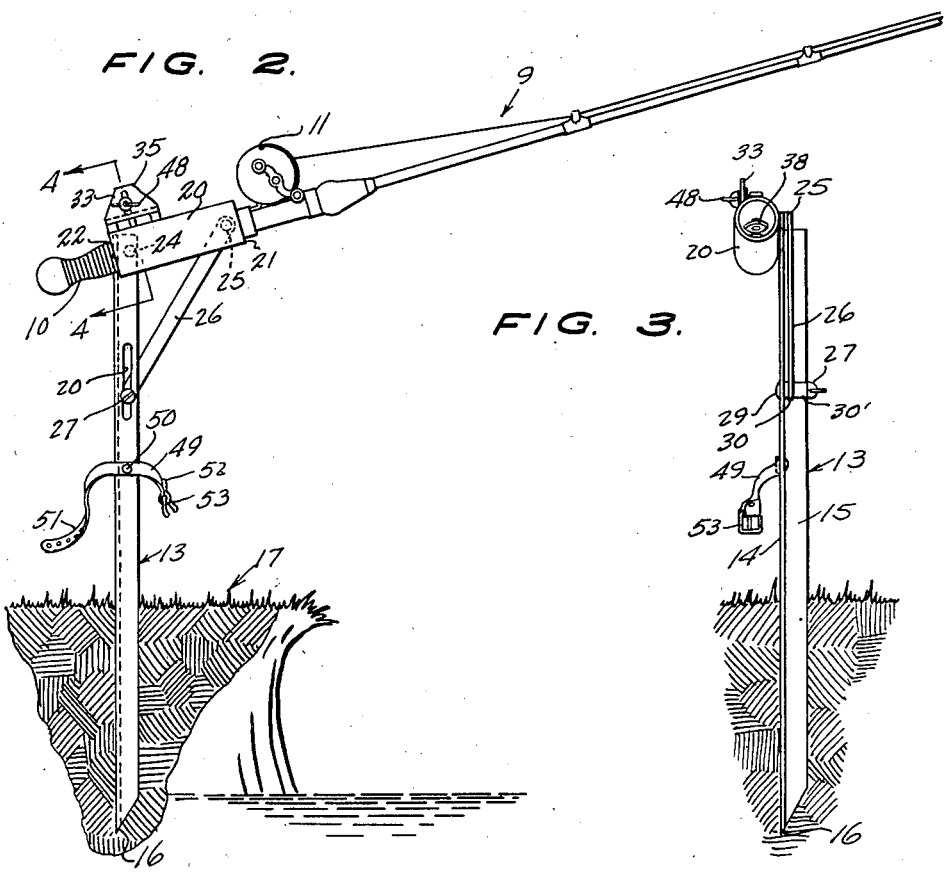
Figure 2 is a side elevation partly in section.

Referring in detail to the drawings, wherein like numerals designate like parts throughout the several views, and first to Figures 1 to 5 thereof, the numeral 9 generally designates a fishing rod having a handle 10 and a reel 11 mounted thereon forwardly of the handle 10; and the numeral 12 generally designates a form of combined rest and carrier device in accordance with the present invention.

The device 12 comprises a standard 13, preferably in the form of an angle iron having a main flange 14 and a secondary flange 15. The lower ends of these flanges are bevelled toward each other to define a piercing point 16, facilitating mounting the standard 13 in the ground 17. The main flange 14 has an outer side 18 and an inner side 19.

An open ended holder sleeve 20, having a forward end 21 and a rearward end 22, is positioned at the outer side 18 of the main flange 14 near the upper end 23 of the standard 13, and a headed rivet 24 traverses the main flange 14 and a rear end portion of the side wall of the sleeve 20 in diametrical relation to the sleeve 20, as shown in detail in Figure 4, whereby the main body of the sleeve 20 extends forwardly from the standard 13 and is capable of being freely swung relative to the standard 13 on a horizontal axis at right angles to the standard 13.

Figure 3:
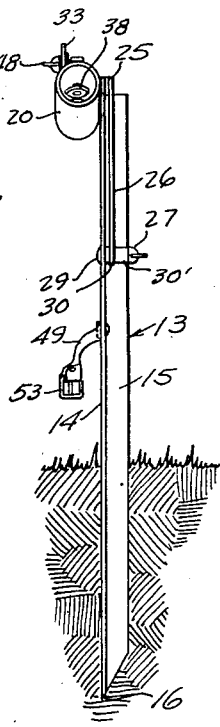
Figure 3 is a front elevation with the fishing rod removed.

Another headed rivet or other suitable securing pivot means 25 traverses the said side wall of the holder sleeve 20 at a point near the forward end 21 of the sleeve, in line with the rivet 24, and traverses the elevated end of a diagonal brace bar 26, which declines toward the standard 13 and is traversed at its lower end by a clamping bolt 27 which extends through a vertically elongated slot 28 which is provided in the main flange 14 of the standard 13. As shown in Figure 3 of the drawings, the brace bar 26 is located at the inner side 19 of the main flange 14, with the head 29 of the bolt 27 engaging the outer flange side 18, a washer 30 positioned between the inner side 19 and the brace bar 26, and with a wing nut 30' engaging the inner side of the brace bar 26. It is obvious that loosening the bolt 27 enables adjusting the same vertically along the slot 28 so as to put the rod holder sleeve 20 at the desired angulation relative to the standard 13, and that retightening the bolt 27, secures the holder 20 in the selected position.

Mounted on the upper side of the holder sleeve 20 near its rear end 22 is a fishing rod handle clamping assembly which comprises a pair of longitudinally spaced bosses 31, 31 rising from the top of the sleeve 20, at opposite ends of an opening 32, an angle member 33 having a horizontal flange 34 secured on and bridging the bosses 31 and a vertical flange 35 located at the outer side of the horizontal flange 34. The horizontal flange 34 is provided with a central hole 36 slidably accommodating a smooth vertical stem 37 which extends downwardly through the sleeve opening 32 and upwardly above the horizontal flange 34. On its lower end the stem 37 has a cushioned clamping foot 38 which is preferably formed of suitably resilient rubber or plastic, for non-marring engagement with the upper side of a fishing rod handle 10, as shown in Figure 4, so as to clamp the rod handle 10 between the foot 38 and the bottom of the interior of the holder sleeve 20.

On the upper end of the stem 37 is a head 39 and spaced therebelow a washer 40, and a helical expanding spring 41 is circumposed on the stem 37 and compressed between the horizontal angle flange 34 and the washer 40. An eye bolt 42 has an eye 43 circumposed on the stem 37 between the head 39 and the washer 40 and a shank 44 extending laterally outwardly through a vertically elongated slot 45 provided in the vertical angle flange 35. A fixed collar 46 on the shank 44 engages the inner side of the vertical flange 35, and a washer 47 on the shank 44 engages the outer side of the flange 35, and a wing nut 48 is threaded on the shank 44 against the washer 47. A rod handle 10 is clamped in the sleeve 20, as shown in Figure 4, by pushing down on the head 39 with the rod handle 10 in place and with the wing nut 48 loosened, and then tightening the wing nut 48.

Figure 5:
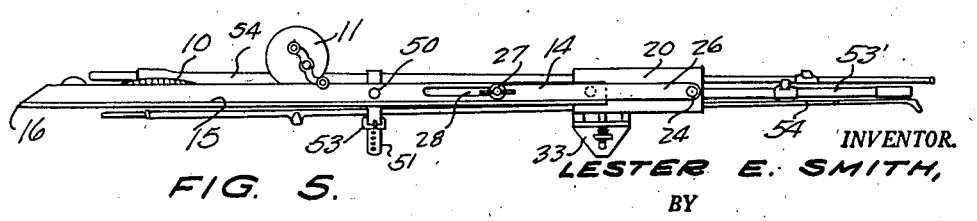
Figure 5 is a side elevation showing the support and a fishing rod in folded and secured carrying relation.

A strap 49 is secured intermediate its ends to the outer side of the main flange 14 at a point intermediate the upper and lower ends of the standard 13, as indicated at 50, so as to provide a tongue part 51 and a buckle part 52 provided at its free end with a buckle 53. As shown in Figure 5, the combined rest and carrier device 12 is adapted to be folded, with the holder sleeve 20 in line with the standard 13, and with the fishing rod 9 positioned along the outer side 18 of the main flange 14, with the rod handle 10 positioned at the pointed end of the standard 13, and with the strap encircling the handle 10, the tongue part 51 being engaged through the buckle 53 of the strap 49, whereby the device 12 and the fishing rod 9 are assembled together as a unit for carrying. Rod sections 53', a gaff 54, and the like are positioned through the holder tube 20 and are secured therein by tightening the clamping assembly on the sleeve 20, and the strap 49 is tightened also around these things so that they are included in the said unit.

Referring now to the form of the invention shown in Figures 6 to 8, which is devised for mounting on a support, such as a boat seat 55, the standard 13 is provided with a mounting clamp which is generally designated 56.

The mounting clamp 56 comprises a reclining U-shaped body composed of a fixed or rigid upper plate 57 and a movable lower plate 58, each plate being of transversely elongated rectangular outline and the plates 57 and 58 constituting clamping arms, arranged for engagement with the upper and lower sides of the boat seat 55. At a point intermediate the ends of one longitudinal side edge of the plates 57 and 58 there project lugs 59 and 60 respectively, which have square openings therein in which is fixed in suitable manner, a square vertical tube 61 which is flush at its upper end with the upper lug 59 and has a lower end portion 62 which depends below the lower lug 60, as shown in Figures 7 and 8 so that the lower movable clamping arm 58 can be moved longitudinally of the tube 61. The inside of the square tube 61 is sized to slidably receive the standard 13 with the flanges 14 and 15 bearing against adjacent sides of the tube 61. A wing bolt 63 is threaded through the rear side of the tube 61 and bears clampably against the secondary flange 15 of the standard 13 so as to lock the standard to the mounting clamp 56.

At each side of the tube 61 is a C-clamp 64 having a lower arm 65 engaged with the under side of the lower clamp plate 58, an upper arm 66 spaced above the upper clamp plate 57, and a clamping screw 67 in the upper arm 66 having a foot 68 bearing upon the upper side of the upper plate 57. The lower C-clamp arms 65 are preferably secured in suitable manner to the lower clamp plate 58. It is obvious that screwing down the clamping screws 57 clamps the boat seat 55 between the clamp arms 57 and 58. The mounting clamp 56 is removable, when desired, by loosening the clamping bolt 63 and sliding the clamp 56 off the lower end of the standard 13.

What is claimed is:

1. In a fishing rod rest, a standard having upper and lower ends, a rod holder sleeve pivoted on the standard at said upper end on an axis extending across the standard, a diagonal brace bar having one end pivoted to said sleeve and another end, first adjustable clamping means securing said other end of the brace bar to the standard at a selected point along the standard, and second clamping means on said sleeve for clamping a fishing rod inserted in the sleeve, said second clamping means comprising an angle member having a horizontal flange secured to the outside of the sleeve and a vertical flange extending from one side of the horizontal flange, a stem working through a hole provided in said horizontal flange and extending into the sleeve through an opening provided therein, a clamping foot on the stem within the sleeve, said vertical flange having a vertical slot, a bolt having a shank extending through said slot, means on one end of said shank securably engaging said stem, expanding spring means compressed between said means and said horizontal flange, a collar on said shank engaging one side of said vertical flange, and a nut on said shank engaging the other side of the vertical flange.

2. In a fishing rod holder including a standard and a sleeve carried by the standard and adapted to support a fishing rod in a position projecting forwardly from the standard, the sleeve having an opening in its side wall, a clamp for engaging the rod in the sleeve comprising: a member fixedly connected to the sleeve exteriorly thereof, a stem having a head axially shiftable in said opening radially of the sleeve, a clamping foot on the stem within the sleeve for engaging the rod to bind the same between the wall of the sleeve and said foot on shifting of the stem radially, inwardly of the sleeve, said member having a slot extending in parallelism with the stem, an eye circumposed about said stem adjacent said head, a threaded shank projecting laterally from the eye and extending slidably through said slot, a spring extending about the stem adjacent the eye and tensioned to bias the stem radially outwardly of the sleeve to retract the foot out of engagement with the rod, and a threaded nut in threaded engagement with said shank and engageable against said member for releasably restraining the shank against movement relative to said member in selected positions to which the shank is shifted along the slot, thus to hold the stem in corresponding, selected positions to which it is adjusted radially inwardly of the sleeve against the restraint of the spring.

3. A collapsible holder for a fishing rod of the type including separable rod sections, comprising: a standard, a sleeve pivotally connected to the standard for swinging movement between a use position in which the sleeve extends angularly to the standard and a collapsed position in which the sleeve extends longitudinally of the standard, means on the sleeve for clamping one of the rod sections therein in longitudinal alignment with the sleeve, thus to correspondingly dispose said section longitudinally of the standard, a brace bar connected at one end to the standard for pivotal movement thereupon and for movement longitudinally of the standard and pivotally connected at its other end to the other end of the sleeve, means for clamping the brace bar to the standard in selected positions to which the brace bar is shifted longitudinally of the standard, whereby to hold the sleeve against pivotal movement upon the standard from each of said positions of the sleeve, and a strap on the standard spaced longitudinally of the standard from the sleeve, said strap having a buckle at one end and a tongue at its other end adjustable within the buckle for closing the strap about the remaining rod sections, the strap when so closed lying wholly in a plane normal to the length of the standard with said remaining sections extending longitudinally of the standard and sleeve alongside the first named section in the collapsed position of the holder.

References Cited in the file of this patent

UNITED STATES PATENTS

| | | |
|---|---|---|
| 550,443 | Deal | Nov. 26, 1895 |
| 612,048 | Miller et al. | Oct. 11, 1898 |
| 1,756,942 | Eddy et al. | May 6, 1930 |
| 2,127,790 | Smoot | Aug. 23, 1938 |
| 2,507,650 | Seiple | May 16, 1950 |
| 2,518,908 | Korus | Aug. 15, 1950 |
| 2,573,635 | Williams | Oct. 30, 1951 |

FOREIGN PATENTS

| | | |
|---|---|---|
| 198,091 | Great Britain | May 31, 1923 |
| 544,020 | France | June 13, 1922 |